US011686395B2

(12) United States Patent
Yoshida et al.

(10) Patent No.: US 11,686,395 B2
(45) Date of Patent: Jun. 27, 2023

(54) GAS VALVE AND FLOW RATE CONTROL METHOD FOR PROPANE GAS

(71) Applicant: KUBOTA Corporation, Osaka (JP)

(72) Inventors: Yasutarou Yoshida, Hirakata (JP); Masataka Taniguchi, Hirakata (JP); Kouhei Mori, Hirakata (JP)

(73) Assignee: KUBOTA Corporation, Osaka (JP)

( * ) Notice: Subject to any disclaimer, the term of this patent is extended or adjusted under 35 U.S.C. 154(b) by 34 days.

(21) Appl. No.: 17/612,595

(22) PCT Filed: Feb. 19, 2021

(86) PCT No.: PCT/JP2021/006297
§ 371 (c)(1),
(2) Date: Nov. 19, 2021

(87) PCT Pub. No.: WO2021/256002
PCT Pub. Date: Dec. 23, 2021

(65) Prior Publication Data
US 2022/0307612 A1    Sep. 29, 2022

(30) Foreign Application Priority Data

Jun. 17, 2020  (JP) ................................ 2020-104586

(51) Int. Cl.
*F16K 3/02*  (2006.01)
*F16K 3/14*  (2006.01)
(Continued)

(52) U.S. Cl.
CPC .............. *F16K 3/0263* (2013.01); *F16K 3/14* (2013.01); *F16K 3/186* (2013.01); *F16K 3/316* (2013.01); *F16K 25/005* (2013.01)

(58) Field of Classification Search
CPC .......... F16K 3/0263; F16K 3/14; F16K 3/186; F16K 3/316; F16K 25/005
(Continued)

(56) References Cited

U.S. PATENT DOCUMENTS

| 2,193,922 | A | * | 3/1940 | Hehemann | ................ | F16K 3/14 |
| | | | | | | 251/327 |
| 2,195,923 | A | * | 4/1940 | Hehemann | ................ | F16K 3/28 |
| | | | | | | 251/327 |

(Continued)

FOREIGN PATENT DOCUMENTS

| CN | 104806777 A | 7/2015 |
| JP | S49-78934 A | 7/1974 |

(Continued)

OTHER PUBLICATIONS

Maddah, Hisham A., "A Comparative Study between Propane Dehydrogenation (PDH) Technologies and Plants in Saudi Arabia," American Scientific Research Journal for Engineering, Technology, and Science, Jul. 24, 2018, vol. 45, No. 1, pp. 49-63.

*Primary Examiner* — John Bastianelli
(74) *Attorney, Agent, or Firm* — Faegre Drinker Biddle & Reath LLP

(57) ABSTRACT

A ring base member of a disc seat ring is fixed to a valve disc using a bolt. The valve disc is formed of a first austenitic stainless steel containing 17.0% by mass to 21.0% by mass of Cr and 8.0% by mass to 13.0% by mass of Ni. The ring base member is formed of a second austenitic stainless steel containing 17.0% by mass to 20.0% by mass of Cr and 8.0% by mass to 15.0% by mass of Ni.

7 Claims, 9 Drawing Sheets

(51) Int. Cl.
*F16K 3/316* (2006.01)
*F16K 3/18* (2006.01)
*F16K 25/00* (2006.01)

(58) Field of Classification Search
USPC ................. 251/193–204, 326–329, 357, 368
See application file for complete search history.

(56) References Cited

U.S. PATENT DOCUMENTS

| | | | | |
|---|---|---|---|---|
| 3,002,525 | A * | 10/1961 | Marvin | F16K 3/0227 |
| | | | | 251/327 |
| 3,177,572 | A * | 4/1965 | Mills | F16K 3/30 |
| | | | | 29/402.09 |
| 3,575,381 | A * | 4/1971 | Gilmore | F16K 1/2263 |
| | | | | 251/359 |
| 2006/0043327 | A1 * | 3/2006 | Hunter | F16K 25/005 |
| | | | | 251/326 |
| 2006/0097215 | A1 | 5/2006 | Pohn et al. | |
| 2014/0056751 | A1 | 2/2014 | Sakamoto et al. | |
| 2015/0108378 | A1 | 4/2015 | Lovell | |

FOREIGN PATENT DOCUMENTS

| | | |
|---|---|---|
| JP | S56-167966 A | 12/1981 |
| JP | H02-268981 A | 11/1990 |
| JP | H05-141546 A | 6/1993 |
| JP | H08-28716 A | 2/1996 |
| JP | 4515906 B2 | 8/2010 |
| WO | WO-2012/132679 A1 | 10/2012 |

\* cited by examiner

GAS VALVE AND FLOW RATE CONTROL METHOD FOR PROPANE GAS

TECHNICAL FIELD

The present disclosure relates to a gas valve and a flow rate control method for propane gas.

BACKGROUND ART

Propane dehydrogenation plants are known (see Hisham A. Maddah, "A Comparative Study between Propane Dehydrogenation (PDH) Technologies and Plants in Saudi Arabia", American Scientific Research Journal for Engineering, Technology, and Science, Jul. 24, 2018, Vol. 45 No. 1, p. 49-63 (NPL 1)). In propane dehydrogenation plants, propane gas is introduced into a dehydrogenation reactor. In the dehydrogenation reactor, propane gas is dehydrogenated to yield propylene gas.

CITATION LIST

Non Patent Literature

NPL 1: Hisham A. Maddah, "A Comparative Study between Propane Dehydrogenation (PDH) Technologies and Plants in Saudi Arabia", American Scientific Research Journal for Engineering, Technology, and Science, Jul. 24, 2018, Vol. 45 No. 1, p. 49-63

SUMMARY OF INVENTION

Technical Problem

In a propane dehydrogenation plant, valves are arranged in a plurality of pipelines in order to control the flow rates of a plurality of gases flowing through a plurality of pipelines connected to a dehydrogenation reactor. Among these arranged valves, the lifetime of a valve arranged in the pipeline carrying propane gas is particularly short. The propane dehydrogenation plant is unable to continuously operate for a long time. The present disclosure is made in view of the problem above and an object of the present disclosure is to provide a gas valve having a longer life and a flow rate control method for propane gas that can control the flow rate of propane gas for a longer time.

Solution to Problem

A gas valve according to the present disclosure includes a valve body and a movable valve. The valve body includes a main body having a flow path through which propane gas having a temperature of 500° C. to 800° C. flows, and a main body seat ring fixed to the main body. The movable valve can open or close the flow path. The movable valve includes a valve stem, a valve disc coupled to the valve stem, and a disc seat ring. The disc seat ring includes a ring base member and a first overlay layer. The ring base member is fixed to the valve disc using a bolt. The first overlay layer is provided on the ring base member and formed of a material having a higher hardness than the ring base member. When the movable valve closes the flow path, the first overlay layer of the disc seat ring hermetically comes into contact with the main body seat ring. The valve disc is formed of a first austenitic stainless steel containing 17.0% by mass to 21.0% by mass of Cr and 8.0% by mass to 13.0% by mass of Ni. The ring base member is formed of a second austenitic stainless steel containing 17.0% by mass to 20.0% by mass of Cr and 8.0% by mass to 15.0% by mass of Ni.

In a flow rate control method for propane gas according to the present disclosure, the gas valve according to the present disclosure is used.

Advantageous Effects of Invention

The gas valve in the present disclosure has a longer life. Furthermore, since the flow rate control method for propane gas in the present disclosure uses the gas valve in the present disclosure, the flow rate control method for propane gas in the present disclosure can control the flow rate of propane gas for a longer time.

DESCRIPTION OF EMBODIMENTS

Figure 1:
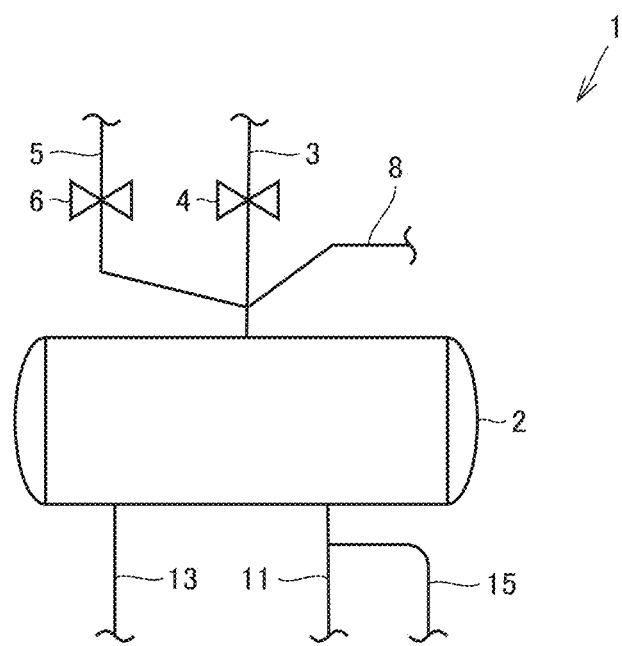
FIG. 1 is a block diagram schematically showing a propane dehydrogenation system according to an embodiment.

Embodiments of the present disclosure will be described below. The same configuration is denoted by the same reference numeral and a description thereof will not be repeated.

Referring to FIG. 1, a propane dehydrogenation system 1 according to an embodiment will be described. Propane dehydrogenation system 1 includes a dehydrogenation reactor 2, pipelines 3, 5, 8, 11, 13, and 15, a gas valve 6, and a valve 4.

Pipeline 3 is connected to dehydrogenation reactor 2. Hot air flows through pipeline 3 to dehydrogenation reactor 2. Hot air has a temperature of, for example, 800° C. to 1000° C. Valve 4 is provided in pipeline 3. Valve 4 opens or closes the flow path of pipeline 3 to control the flow rate of hot air. Pipeline 5 is connected to pipeline 3. Propane gas flows through pipelines 3 and 5 to dehydrogenation reactor 2. Propane gas has a temperature of, for example, 500° C. to 800° C. Gas valve 6 is provided in pipeline 5. Gas valve 6 opens or closes the flow path of pipeline 5 to control the flow rate of propane gas. Pipeline 8 is connected to pipeline 3.

Gas such as steam and reducing gas passes through pipelines 3 and 8 to dehydrogenation reactor 2.

Dehydrogenation reactor 2 includes a catalyst such as $Cr_2O_3/Al_2O_3$. In dehydrogenation reactor 2, propane ($C_3H_8$) gas flowing into dehydrogenation reactor 2 is dehydrogenated to generate propylene ($C_3H_6$) gas. In dehydrogenation reactor 2, for example, a CATOFIN (registered trademark) process is performed. Dehydrogenation reactor 2 is, for example, a CATOFIN (registered trademark) reactor.

Pipeline 11 is connected to dehydrogenation reactor 2. The exhaust air passes through pipeline 11 and is discharged from dehydrogenation reactor 2. Pipeline 13 is connected to dehydrogenation reactor 2. Propylene gas passes through pipeline 13 and is discharged from dehydrogenation reactor 2. Pipeline 15 is connected to pipeline 11. When dehydrogenation reactor 2 is evacuated, gas in dehydrogenation reactor 2 passes through pipelines 11 and 15 and is discharged from dehydrogenation reactor 2.

Referring to FIG. 2 to FIG. 8, gas valve 6 according to the present embodiment will be described. Gas valve 6 includes a valve body 20, a movable valve 40, an inert gas supplier 36, a pipeline 37, a valve 38, and a pressure gauge 39.

Valve body 20 includes a main body 21, a main body seat rings 26a and 26b, a valve seat 33, and a bonnet 35.

Figure 4:
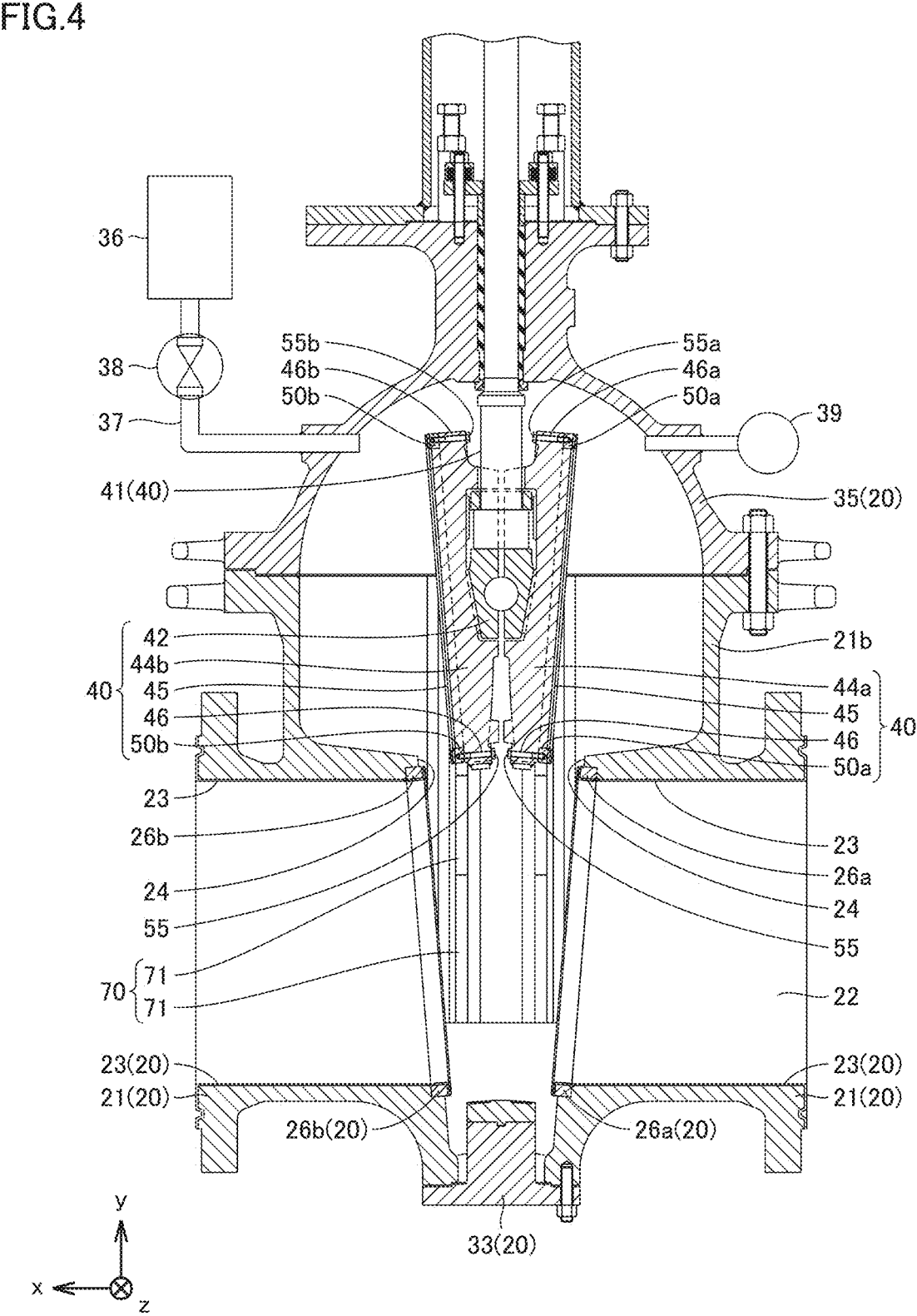
FIG. 4 is a partially enlarged schematic cross section of the gas valve (completely open state) according to the embodiment.
Figure 5:
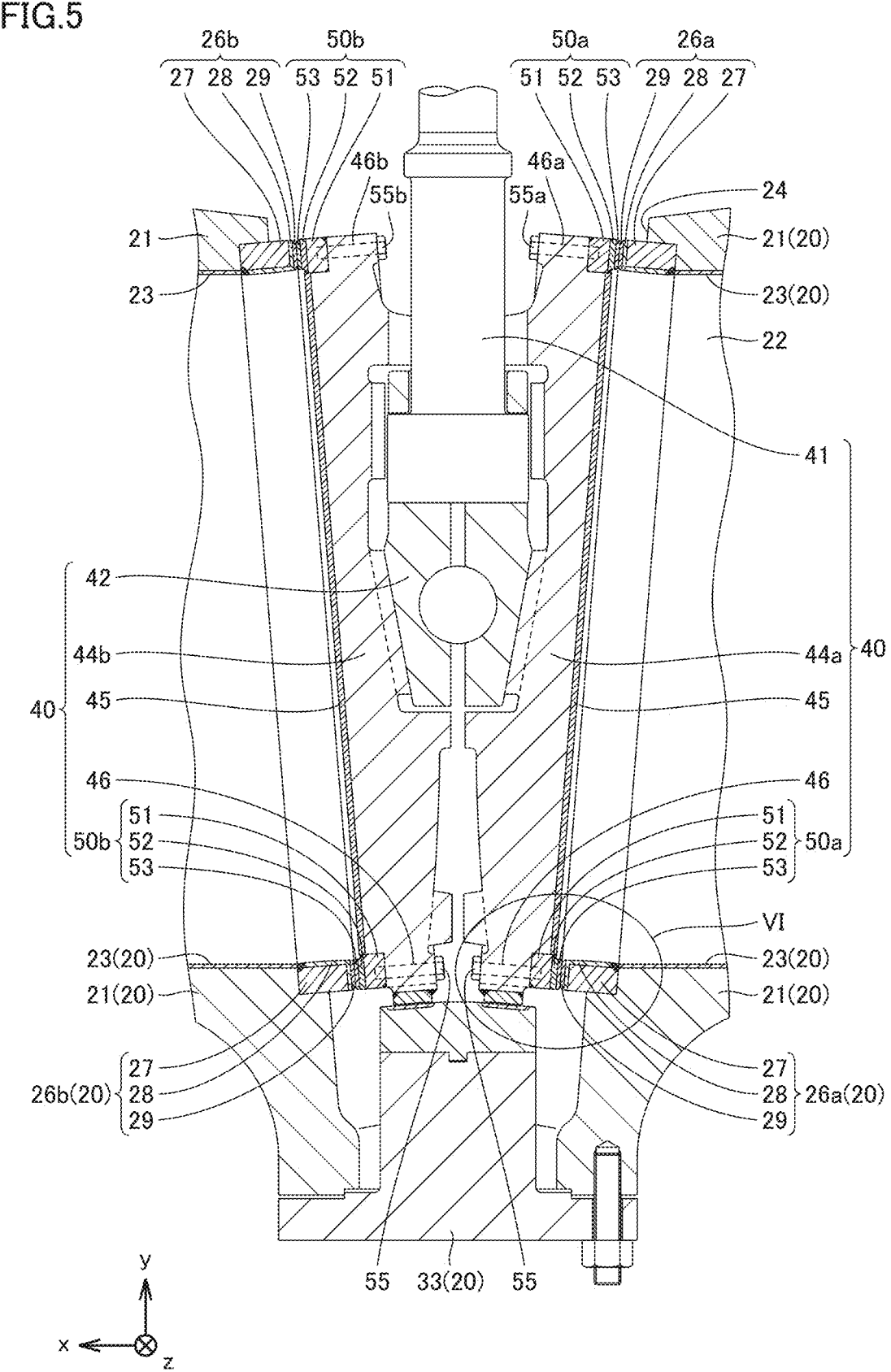
FIG. 5 is a partially enlarged schematic cross section of a region V shown in FIG. 3 of the gas valve according to the embodiment.

Main body 21 has a flow path 22 through which propane gas having a temperature of 500° C. to 800° C. flows. Specifically, the inner surface of main body 21 defines flow path 22. Flow path 22 extends along a first direction (x direction). Propane gas flows through flow path 22 along the first direction (x direction). The diameter of flow path 22 is, for example, 1.0 m to 3.0 m. Main body 21 has a tubular member 21b. Tubular member 21b extends, for example, in a second direction (y direction) normal to the first direction (x direction). Tubular member 21b extends in a moving direction (second direction (y direction)) of movable valve 40. As shown in FIG. 4, the cavity in tubular member 21b is communicatively connected to flow path 22.

Main body 21 is formed of austenitic stainless steel containing 17.0% by mass to 21.0% by mass of Cr and 8.0% by mass to 13.0% by mass of Ni. The austenitic stainless steel forming main body 21 is, for example, cast steel. The austenitic stainless steel forming main body 21 is, for example, ASTM A351 Grade CF3, CF3A, CF8, CF8A, CF3M, CF3MA, CF8M, CF3MN, CF8C, CF10, or CF10M.

Main body 21 includes an overlay layer 23. Overlay layer 23 is provided on the inner surface of main body 21. Specifically, overlay layer 23 is welded to the inner surface of main body 21. Overlay layer 23 is formed of a material containing more Cr than main body 21 and more Ni than main body 21. Overlay layer 23 is formed of, for example, austenitic stainless steel containing 24.0% by mass to 26.0% by mass of Cr and 19.0% by mass to 22.0% by mass of Ni.

Figure 2:
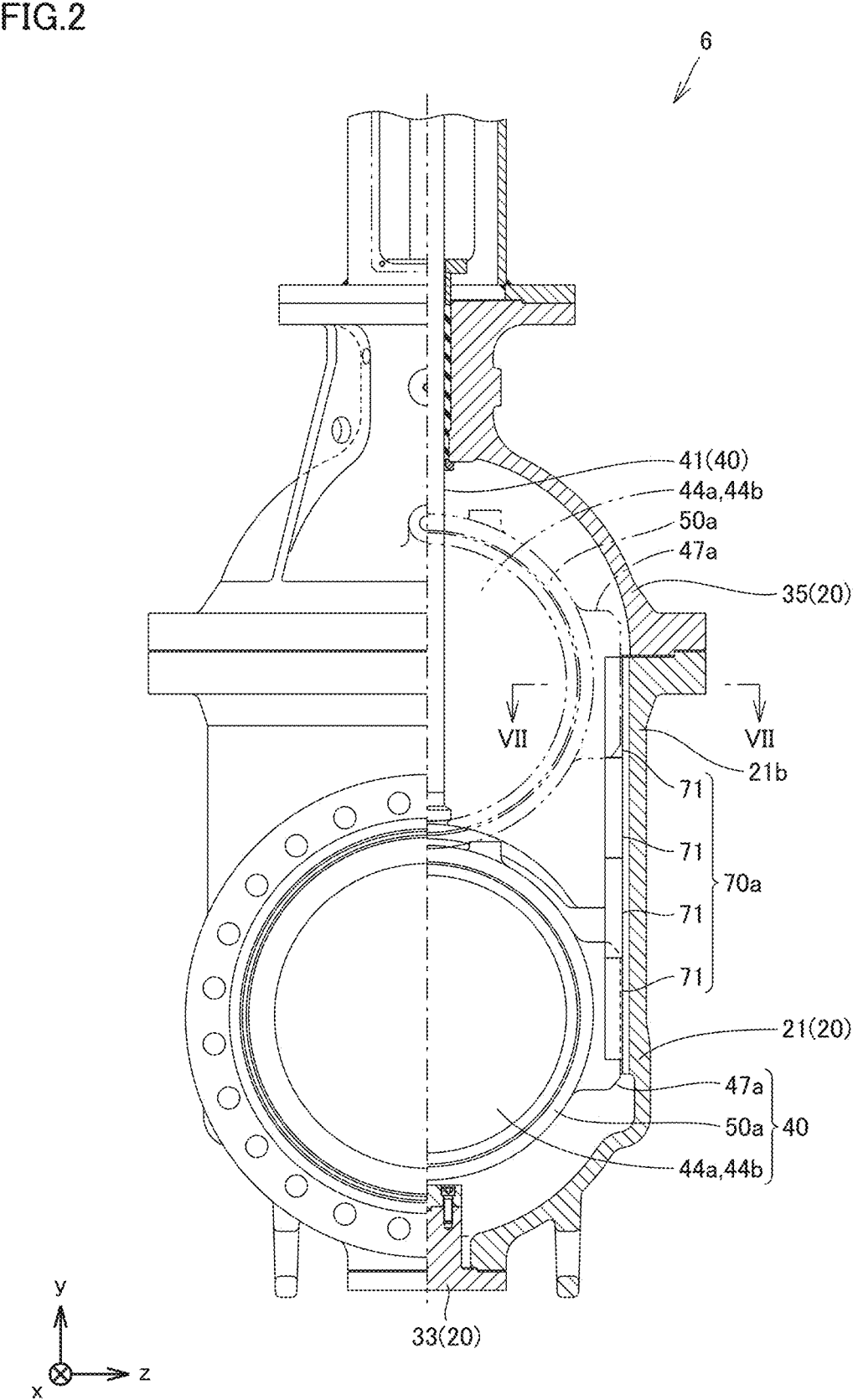
FIG. 2 is a partially enlarged schematic cross section of a gas valve according to the embodiment.
Figure 6:
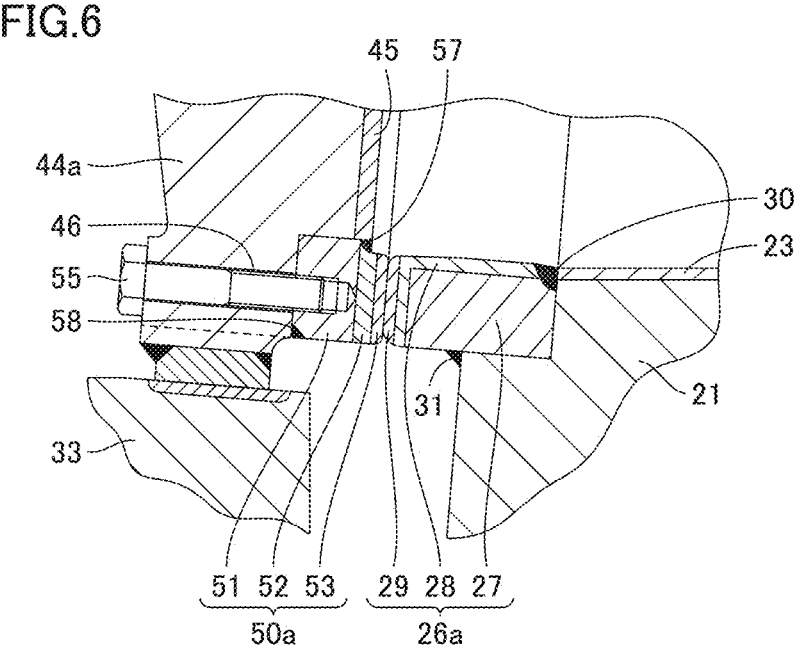
FIG. 6 is a partially enlarged schematic cross section of a region VI shown in FIG. 5 of the gas valve according to the embodiment.

As shown in FIG. 2 and FIG. 6, valve seat 33 is fixed to main body 21. When movable valve 40 closes flow path 22, valve discs 44a and 44b of movable valve 40 come into abutment with valve seat 33 and are pressed against valve seat 33.

Figure 3:
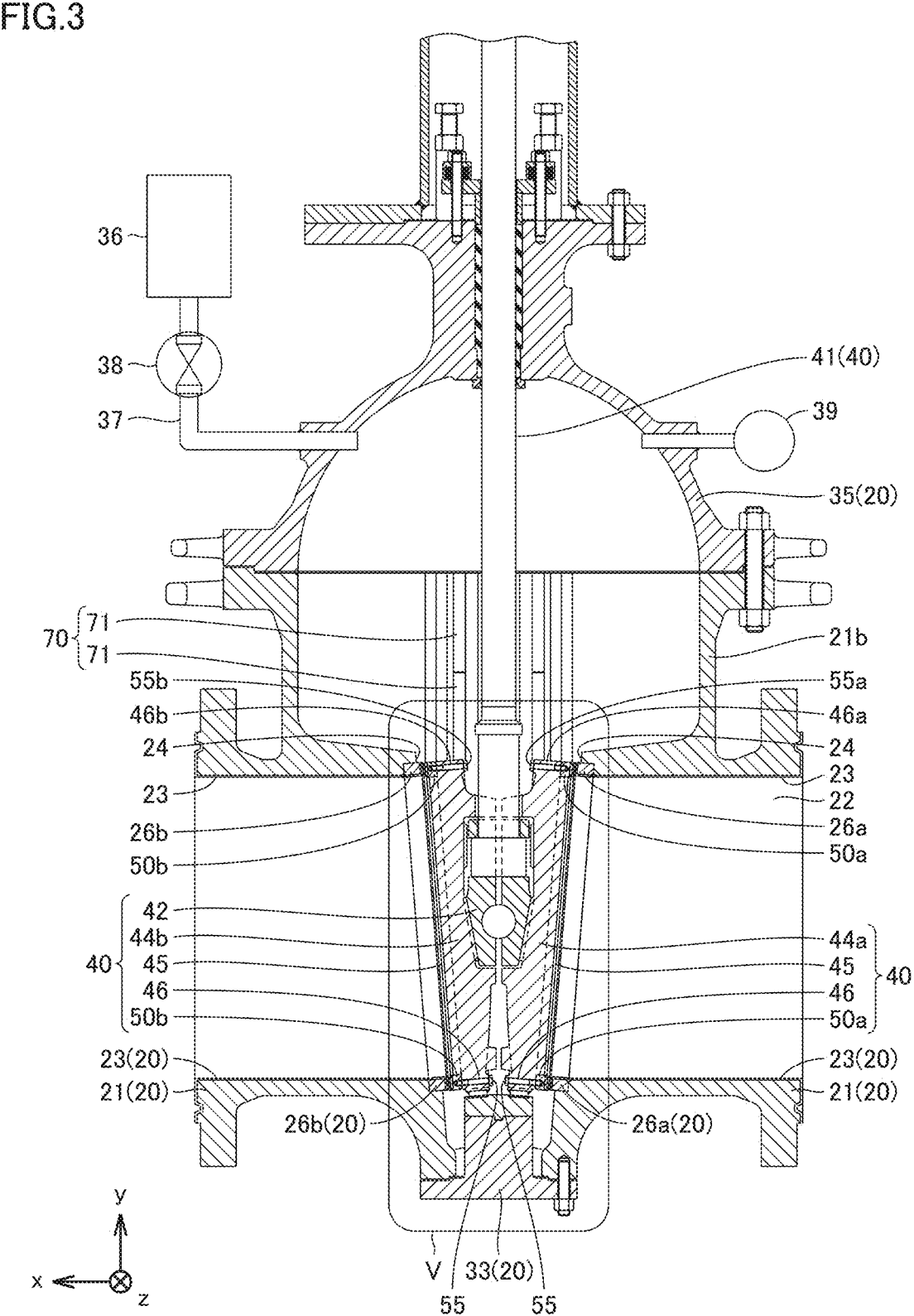
FIG. 3 is a partially enlarged schematic cross section of the gas valve (completely closed state) according to the embodiment.

As shown in FIG. 2 to FIG. 4, bonnet 35 is connected to tubular member 21b of main body 21. Bonnet 35 is fixed to tubular member 21b, for example, using bolts. When movable valve 40 opens or closes flow path 22, valve discs 44a and 44b move in an internal cavity formed with tubular member 21b and bonnet 35. When movable valve 40 opens flow path 22, at least parts of valve discs 44a and 44b are accommodated in the internal cavity formed with tubular member 21b and bonnet 35.

Referring to FIG. 3 and FIG. 4, inert gas supplier 36 includes, for example, a tank (not shown) and a pump (not shown). The tank stores inert gas such as nitrogen gas. The pump feeds the inert gas from the tank to pipeline 37. The inert gas is thus supplied from inert gas supplier 36 into the internal cavity formed with tubular member 21b and bonnet 35. The pressure of the inert gas in the internal cavity formed with tubular member 21b and bonnet 35 is higher than the pressure of propane gas flowing through flow path 22. The propane gas therefore can be prevented from intruding into the internal cavity formed with tubular member 21b and bonnet 35. The propane gas can be prevented from bypassing the internal cavity formed with tubular member 21b and bonnet 35 and flowing from the upstream side of gas valve 6 to the downstream side of gas valve 6.

Valve 38 is provided in pipeline 37. The pressure of the inert gas in the internal cavity formed with tubular member 21b and bonnet 35 can be regulated using valve 38. Pressure gauge 39 measures the pressure of the inert gas in the internal cavity formed with tubular member 21b and bonnet 35.

As shown in FIG. 3 to FIG. 6, main body seat rings 26a and 26b are fixed to main body 21. Main body seat ring 26a is arranged on the upstream side of flow path 22 with respect to movable valve 40 in the first direction (x direction). Main body seat ring 26b is arranged on the downstream side of flow path 22 with respect to movable valve 40 in the first direction (x direction). When movable valve 40 closes flow path 22, main body seat ring 26a hermetically comes into contact with a disc seat ring 50a of valve disc 44a, and main body seat ring 26b hermetically comes into contact with a disc seat ring 50b of valve disc 44b.

Main body seat rings 26a and 26b can be removed from main body 21 using a jig (not shown). Main body seat rings 26a and 26b are replaceable parts. In maintenance of gas valve 6, main body seat rings 26a and 26b that have been used can be replaced with new main body seat rings 26a and 26b.

Main body seat ring 26b has the same configuration as main body seat ring 26a. The configuration of main body seat ring 26a will be described below. Main body seat ring 26a includes a ring base member 27, an overlay layer 28, and an overlay layer 29.

Ring base member 27 is fixed to main body 21. For example, ring base member 27 is welded to main body 21 at weld zones 30 and 31. Ring base member 27 is formed of austenitic stainless steel containing 17.0% by mass to 20.0% by mass of Cr and 8.0% by mass to 15.0% by mass of Ni. The austenitic stainless steel forming ring base member 27 is, for example, forging steel. The austenitic stainless steel forming ring base member 27 is, for example, ASTM A182 Grade F304N, F304LN, F317, F317L, F321, F321H, F347, or F347H.

Overlay layer 29 is provided on ring base member 27. Overlay layer 29 may be provided on ring base member 27 with overlay layer 28 interposed therebetween. Overlay layer 29 is formed of a material having a higher hardness than ring base member 27. Overlay layer 29 is formed of, for example, a cobalt-molybdenum-chromium alloy such as Tribaloy (registered trademark) T-800. When movable valve 40 closes flow path 22, overlay layer 29 hermetically comes into contact with the disc seat ring (overlay layer 53).

Overlay layer 28 is provided on the inner surface of main body seat ring 26a connected to the inner surface of main body 21. Specifically, overlay layer 28 is welded to the inner surface of main body seat ring 26a. Overlay layer 28 may also be provided between main body 21 and overlay layer 29. Overlay layer 28 is formed of a material containing more Cr than ring base member 27 and more Ni than ring base member 27. Overlay layer 28 is formed of austenitic stainless steel containing 24.0% by mass to 26.0% by mass of Cr and 19.0% by mass to 22.0% by mass of Ni.

As shown in FIG. 2 to FIG. 7, movable valve 40 can open or close flow path 22. Movable valve 40 includes a valve stem 41, a wedge member 42, valve discs 44a and 44b, an overlay layer 45, disc seat rings 50a and 50b, and protrusions 47a and 47b.

Valve stem 41 can move in the second direction (y direction) using an actuator mechanism (not shown). Wedge member 42 is attached to an end portion of valve stem 41 in proximity to flow path 22. Wedge member 42 has a shape tapered toward valve seat 33. Wedge member 42 includes a pair of inclined surfaces. Valve discs 44a and 44b are coupled to valve stem 41. When movable valve 40 closes flow path 22, a pair of inclined surfaces of wedge member 42 comes into contact with valve discs 44a and 44b, and wedge member 42 pushes valve discs 44a and 44b. Disc seat rings 50a and 50b attached to valve discs 44a and 44b hermetically come into contact with main body seat rings 26a and 26b.

Valve discs 44a and 44b are formed of austenitic stainless steel containing 17.0% by mass to 21.0% by mass of Cr and 8.0% by mass to 13.0% by mass of Ni. The austenitic stainless steel forming valve discs 44a and 44b is, for example, cast steel. The austenitic stainless steel forming valve discs 44a and 44b is, for example, ASTM A351 Grade CF3, CF3A, CF8, CF8A, CF3M, CF3MA, CF8M, CF3MN, CF8C, CF10, or CF10M.

Overlay layer 45 is formed on surfaces of valve discs 44a and 44b facing flow path 22. Overlay layer 45 is formed of a material containing more Cr than valve discs 44a and 44b and more Ni than valve discs 44a and 44b. Overlay layer 45 is formed of, for example, austenitic stainless steel containing 24.0% by mass to 26.0% by mass of Cr and 19.0% by mass to 22.0% by mass of Ni.

As shown in FIG. 3 to FIG. 6, disc seat rings 50a and 50b are fixed to valve discs 44a and 44b. Disc seat ring 50a is arranged on the upstream side of flow path 22 with respect to valve discs 44a and 44b in the first direction (x direction). Disc seat ring 50b is arranged on the downstream side of flow path 22 with respect to valve discs 44a and 44b in the first direction (x direction). When movable valve 40 closes flow path 22, disc seat ring 50a hermetically comes into contact with main body seat ring 26a, and disc seat ring 50b hermetically comes into contact with main body seat ring 26b.

Disc seat rings 50a and 50b can be removed from valve discs 44a and 44b using a jig (not shown). Disc seat rings 50a and 50b are replaceable parts. In maintenance of gas valve 6, disc seat rings 50a and 50b that have been used can be replaced with new disc seat rings 50a and 50b.

Disc seat ring 50b has the same configuration as disc seat ring 50a. The configuration of disc seat ring 50a will be described below. Disc seat ring 50a includes a ring base member 51 and an overlay layer 53. Disc seat ring 50a may further include an overlay layer 52.

Ring base member 51 is fixed to valve disc 44a. For example, a threaded hole 46 is formed in valve disc 44a and ring base member 51, and ring base member 51 is fixed to valve disc 44a using a bolt 55 screwed in threaded hole 46. Ring base member 51 is formed of austenitic stainless steel containing 17.0% by mass to 20.0% by mass of Cr and 8.0% by mass to 15.0% by mass of Ni. The austenitic stainless steel forming ring base member 51 is, for example, forging steel. The austenitic stainless steel forming ring base member 51 is, for example, ASTM A182 Grade F304N, F304LN, F317, F317L, F321, F321H, F347, or F347H. Ring base member 51 may be further welded to valve disc 44a at weld zones 57 and 58.

Overlay layer 53 is provided on ring base member 51. Overlay layer 53 may be provided on ring base member 51 with overlay layer 52 interposed therebetween. Overlay layer 53 is formed of a material having a higher hardness than ring base member 51. Overlay layer 53 is formed of, for example, a cobalt-molybdenum-chromium alloy such as Tribaloy (registered trademark) T-800. When movable valve 40 closes flow path 22, overlay layer 53 hermetically comes into contact with main body seat ring 26a (overlay layer 29).

Overlay layer 52 is provided between ring base member 51 and overlay layer 53. Overlay layer 52 is formed of a material containing more Cr than ring base member 51 and more Ni than ring base member 51. Overlay layer 52 is formed of, for example, austenitic stainless steel containing 24.0% by mass to 26.0% by mass of Cr and 19.0% by mass to 22.0% by mass of Ni.

Figure 7:
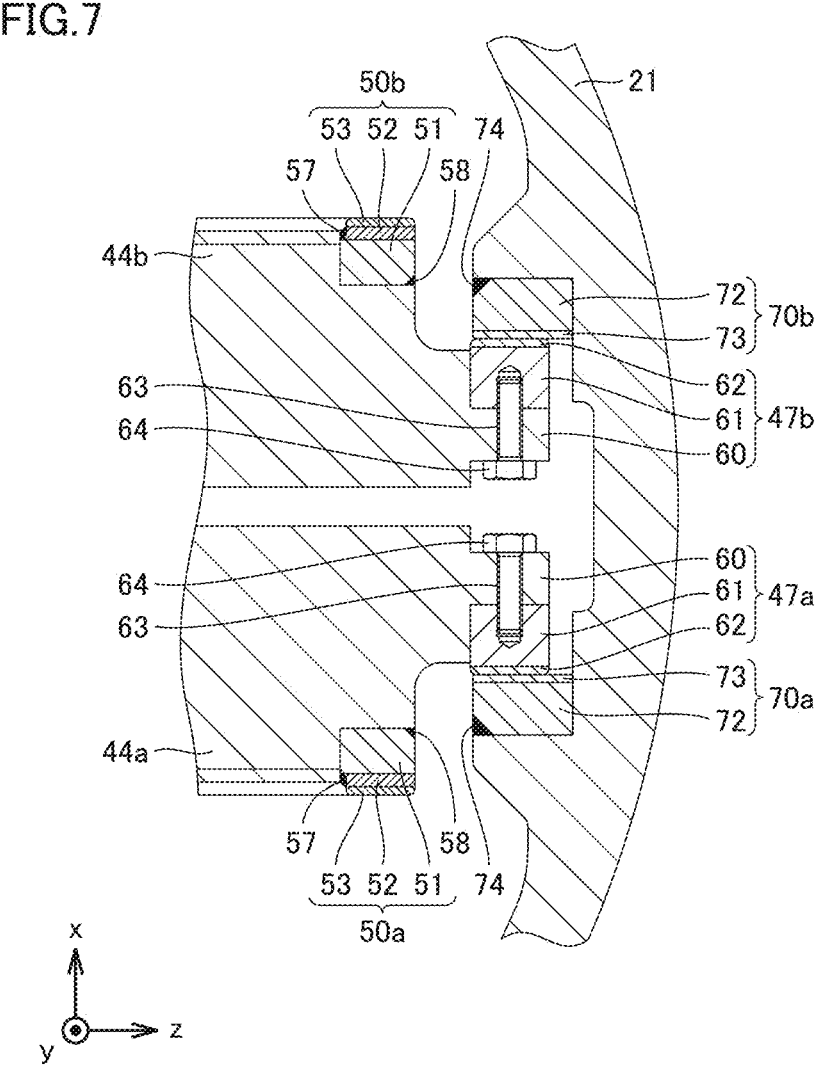
FIG. 7 is a partially enlarged schematic cross section along line VII-VII in FIG. 2 of the gas valve according to the embodiment.
Figure 8:
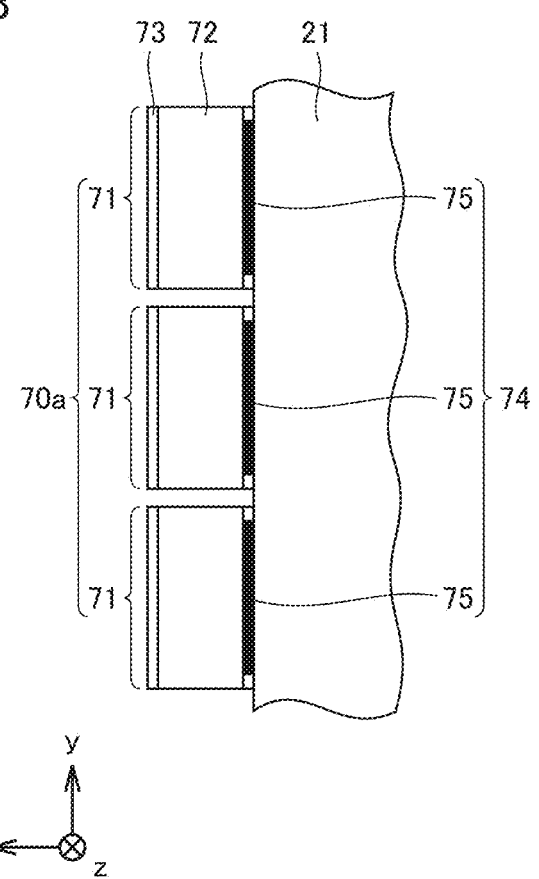
FIG. 8 is a partially enlarged schematic side view of the gas valve according to the embodiment.

As illustrated in FIG. 7, protrusion 47a is provided at valve disc 44a. Protrusion 47b is provided at valve disc 44b. Protrusion 47a can slide on a guide member 70a. Protrusion 47b can slide on a guide member 70b. Protrusion 47b has the same configuration as protrusion 47a. The configuration of protrusion 47a will be described below.

Protrusion 47a protrudes from valve disc 44a in a third direction (z direction) normal to the first direction (x direction) and the second direction (y direction). Protrusion 47a includes a protrusion base 60, a block 61, and an overlay layer 62.

Protrusion base 60 is formed of, for example, the same material as valve disc 44a. Protrusion base 60 is formed, for example, integrally with valve disc 44a.

Block 61 is fixed to protrusion base 60. Specifically, a threaded hole 63 is formed in protrusion base 60 and block 61, and block 61 is fixed to protrusion base 60 using a bolt 64 screwed in threaded hole 63. Block 61 can be removed from protrusion base 60 (valve disc 44a). Block 61 is a replaceable part. In maintenance of gas valve 6, block 61 that has been used can be replaced with new block 61.

Block 61 is formed of austenitic stainless steel containing 17.0% by mass to 20.0% by mass of Cr and 8.0% by mass to 15.0% by mass of Ni. The austenitic stainless steel forming block 61 is, for example, forging steel. The austenitic stainless steel forming block 61 is, for example, ASTM A182 Grade F304N, F304LN, F317, F317L, F321, F321H, F347, or F347H.

Overlay layer 62 is provided on block 61. Overlay layer 62 is formed of a material having a higher hardness than block 61 and valve disc 44a. Overlay layer 62 is formed of, for example, a cobalt-molybdenum-chromium alloy such as Tribaloy (registered trademark) T-800. Overlay layer 62 is in contact with guide member 70a.

Referring to FIG. 2 to FIG. 4, FIG. 7, and FIG. 8, valve body 20 further includes guide members 70a and 70b. Guide members 70a and 70b guide valve discs 44a and 44b. Specifically, when movable valve 40 moves in the second direction (y direction), protrusions 47a and 47b of movable valve 40 slide on guide members 70a and 70b, and valve discs 44a and 44b are guided by guide members 70a and 70b. Guide member 70a faces protrusion 47a of movable valve 40. Guide member 70b faces protrusion 47b of movable valve 40. One end of each of guide members 70a and 70b extends to flow path 22. The other end of each of guide members 70a and 70b extends into the internal cavity formed with tubular member 21b of main body 21 and bonnet 35.

Guide members 70a and 70b are fixed to main body 21. Guide members 70a and 70b can be removed from main body 21 using a jig (not shown). Guide members 70a and 70b are replaceable parts. In maintenance of gas valve 6, guide members 70a and 70b that have been used can be replaced with new guide members 70a and 70b.

Guide member 70b has the same configuration as guide member 70a. The configuration of guide member 70a will be described below. Guide member 70a includes a guide base member 72 and an overlay layer 73.

Guide base member 72 is fixed to main body 21. For example, guide base member 72 is welded to main body 21 at a weld zone 74. Guide base member 72 is formed of austenitic stainless steel containing 17.0% by mass to 20.0% by mass of Cr and 8.0% by mass to 15.0% by mass of Ni. The austenitic stainless steel forming guide base member 72 is, for example, forging steel. The austenitic stainless steel forming guide base member 72 is, for example, ASTM A182 Grade F304N, F304LN, F317, F317L, F321, F321H, F347, or F347H.

Overlay layer 73 is provided on guide base member 72. Overlay layer 73 of guide member 70a faces overlay layer 62 of protrusion 47a. Overlay layer 73 is formed of a material having a higher hardness than guide base member 72. Overlay layer 73 is formed of austenitic stainless steel containing 24.0% by mass to 26.0% by mass of Cr and 19.0% by mass to 22.0% by mass of Ni. Overlay layer 73 is formed of, for example, a cobalt-molybdenum-chromium alloy such as Tribaloy (registered trademark) T-800. Overlay layer 29 of guide member 70a is in contact with overlay layer 62 of protrusion 47a.

Guide members 70a and 70b each include a plurality of guide portions 71. A plurality of guide portions 71 each include guide base member 72 and overlay layer 73. A plurality of guide portions 71 are spaced apart from each other and arranged in the second direction (y direction) that is the moving direction of movable valve 40. Weld zone 74 includes a plurality of weld portions 75. A plurality of guide portions 71 are welded to main body 21 at the corresponding weld portions 75. A plurality of weld portions 75 are spaced apart from each other.

Figure 9:
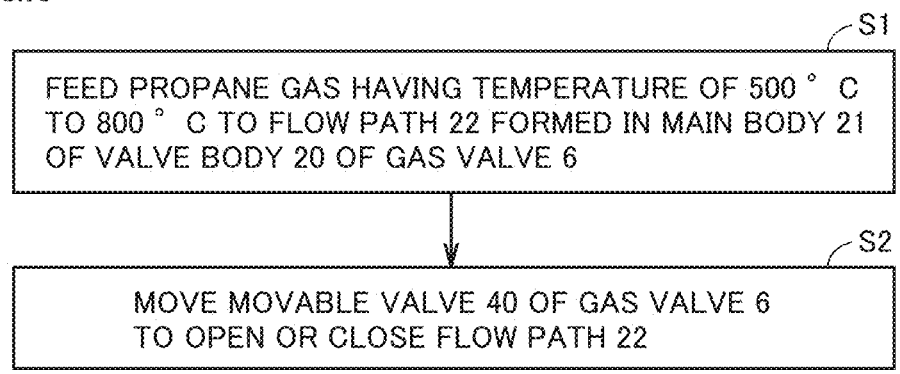
FIG. 9 is a flowchart of a flow rate control method for propane gas according to an embodiment.

Referring to FIG. 9, a flow rate control method for propane gas according to the present embodiment using gas valve 6 will be described.

The flow rate control method for propane gas according to the present embodiment includes feeding propane gas having a temperature of 500° C. to 800° C. to flow path 22 formed in main body 21 of valve body 20 of gas valve 6 (S1). Specifically, propane gas having a temperature of 500° C. to 800° C. is fed to pipeline 5 (see FIG. 1). The propane gas having a temperature of 500° C. to 800° C. flows through flow path 22 formed in main body 21 of valve body 20 of gas valve 6. The flow rate control method for propane gas according to the present embodiment includes moving movable valve 40 of gas valve 6 to open or close flow path 22 (S2). Movable valve 40 (valve discs 44a and 44b) opens or closes flow path 22 whereby the flow rate of the propane gas can be controlled.

Figure 10:
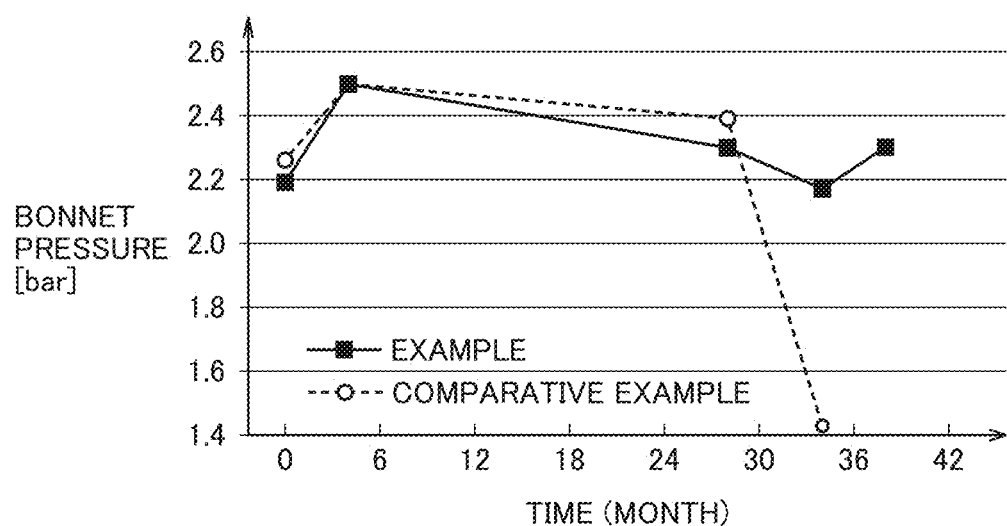
FIG. 10 is a graph showing change in pressure over time in a bonnet in the gas valve according to the embodiment and a gas valve according to a comparative example.

Referring to FIG. 10, the operation of gas valve 6 according to the present embodiment will be described by comparing gas valve 6 of Example that is an example of the present embodiment with a gas valve of Comparative Example.

In gas valve 6 of Example, main body 21, bonnet 35, and valve discs 44a and 44b are formed of austenitic stainless steel of ASTM 351 Grade CF8C. The austenitic stainless steel of ASTM 351 Grade CF8C contains 18.0% by mass to 21.0% by mass of Cr and 9.0% by mass to 12.0% by mass of Ni. In gas valve 6 of Example, main body seat rings 26a and 26b, disc seat rings 50a and 50b, block 61, and guide base member 72 are formed of austenitic stainless steel of ASTM A182 Grade F321H. The austenitic stainless steel of ASTM A182 Grade F321H contains 17.0% by mass to 19.0% by mass of Cr and 9.5% by mass to 12.0% by mass of Ni.

The gas valve of Comparative Example includes a configuration similar to that of gas valve 6 according to the present embodiment but differs in the following points. In the gas valve of Comparative Example, main body 21, bonnet 35, and valve discs 44a and 44b are formed of a low alloy steel of ASTM 217 Grade C5. The low alloy steel of ASTM 217 Grade C5 contains 4.0% by mass to 6.5% by mass of Cr and 0.5% or less by mass of Ni. In the gas valve of Comparative Example, main body seat rings 26a and 26b, disc seat rings 50a and 50b, block 61, and guide base member 72 are formed of a low alloy steel of ASTM A182 Grade F5a. The low alloy steel of ASTM A182 Grade F5a contains 4.0% by mass to 6.0% by mass of Cr and 0.50% or less by mass of Ni.

As shown in FIG. 10, gas valve 6 of Example has a longer life than the gas valve of Comparative Example. Gas valve 6 of Example has a bonnet pressure higher than 2.0 bar for a longer time than the gas valve of Comparative Example. The bonnet pressure is the pressure of inert gas in the internal cavity formed with tubular member 21b of main body 21 and bonnet 35. The bonnet pressure is measured using pressure gauge 39.

Specifically, the bonnet pressure in the gas valve of Comparative Example is higher than 2.0 bar for about 28 months after the start of use of the gas valve of Comparative Example but falls steeply about 34 months after the start of use of the gas valve of Comparative Example. This means that the inert gas leaks out of the gas valve of Comparative Example in the interval between the point of time about 28 months after the start of use of the gas valve of Comparative Example and the point of time about 34 months after the start of use of the gas valve of Comparative Example. The gas valve of Comparative Example needs to be replaced no later than about 34 months after the start of use of the gas valve of Comparative Example. By contrast, gas valve 6 of Example has a bonnet pressure higher than 2.0 bar even 38 months after the start of use of gas valve 6 of Example. Gas valve 6 of Example can be continuously used without being replaced with new gas valve 6 for at least 38 months.

The inventor of the present invention analyzed gas valve 6 of Example and the gas valve of Comparative Example. As the result, the inventor found that coking occurred in the gas valve of Comparative Example and this shortened the lifetime of the gas valve of Comparative Example. Coking is a phenomenon in which carbon is generated by thermal decomposition of hydrocarbons and deposited and accumulated on a surface of metal. The inventor found for the first time that coking occurs in a gas valve provided in a pipeline connected to a propane dehydrogenation reactor and carrying propane gas, and this coking has an influence on damage to a member inside the valve.

Specifically, coking occurred mainly in the inside of threaded hole 46 (a gap between bolt 55 and valve disc 44a, 44b and a gap between bolt 55 and ring base member 51), a gap between main body 21 and guide member 70a, 70b and a gap between main body 21 and overlay layer 23.

Bolt 55 becomes loosened or bolt 55 drops off due to coking occurring in the inside of threaded hole 46 (the gap between bolt 55 and valve disc 44a, 44b, and the gap between bolt 55 and ring base member 51). Disc seat rings 50a and 50b incline to main body seat rings 26a and 26b. A gap occurs between disc seat ring 50a, 50b and main body seat ring 26a, 26b. The inert gas passes through this gap and leaks out of the internal cavity formed with tubular member 21b and bonnet 35.

At the start of use of the gas valve of Comparative Example, there is no gap between main body 21 and guide member 70a, 70b (guide base member 72). However, in the course of use of the gas valve of Comparative Example, thermal stress is repeatedly applied to main body 21 and guide members 70a and 70b (guide base member 72). For this, in the course of use of the gas valve of Comparative Example, a gap like a crack appears in weld zone 74 between main body 21 and guide member 70a, 70b (guide base member 72). Coking occurs in this gap. This coking causes guide members 70a and 70b to incline to main body 21 or drop off main body 21. Guide members 70a and 70b guide valve discs 44a and 44b. Disc seat rings 50a and 50b fixed to valve discs 44a and 44b incline to main body seat rings 26a and 26b. A gap occurs between disc seat ring 50a, 50b and main body seat ring 26a, 26b. The inert gas passes through this gap and leaks out of the internal cavity formed with tubular member 21b and bonnet 35.

At the start of use of the gas valve of Comparative Example, there is no gap between main body 21 and overlay layer 23. However, in the course of use of the gas valve of Comparative Example, thermal stress is repeatedly applied to main body 21 and overlay layer 23. For this, in the course of use of the gas valve of Comparative Example, a gap like a crack appears in the weld zone between main body 21 and overlay layer 23. Coking occurs in these gaps. Coking causes cracking in weld zones 30 and 31, and coking causes skewing of main body 21 and main body seat rings 26a and 26b. Main body seat rings 26a and 26b incline to disc seat rings 50a and 50b. A gap occurs between disc seat ring 50a, 50b and main body seat ring 26a, 26b. The inert gas passes through this gap and leaks out of the internal cavity formed with tubular member 21b and bonnet 35.

In Example, valve discs 44a and 44b are formed of austenitic stainless steel containing 17.0% or more by mass of Cr and 8.0% or more by mass of Ni. Ring base member 51 is formed of austenitic stainless steel containing 17.0% or more by mass of Cr and 8.0% or more by mass of Ni. Valve discs 44a and 44b and ring base member 51 in Example contain a higher ratio of Cr than valve discs 44a and 44b and ring base member 51 in Comparative Example. Therefore, coking occurring in the inside of threaded hole 46 (the gap between bolt 55 and valve disc 44a, 44b and the gap between bolt 55 and ring base member 51) can be eliminated or significantly reduced. Furthermore, valve discs 44a and 44b and ring base member 51 in Example contain a higher ratio of Ni than valve discs 44a and 44b and ring base member 51 in Comparative Example. Therefore, even when the Cr content in valve discs 44a and 44b and ring base member 51 is increased, the austenite structure of the stainless steel forming valve discs 44a and 44b and ring base member 51 can be stabilized. Gas valve 6 of Example has a longer life than the gas valve of Comparative Example.

When hydrocarbon gas flowing through flow path 22 is propane gas, the amount of coking occurring per unit time in the inside of threaded hole 46 (the gap between bolt 55 and valve disc 44a, 44b and the gap between bolt 55 and ring base member 51) is small. Therefore, even when valve discs 44a and 44b are formed of austenitic stainless steel containing 21.0% or less by mass of Cr and ring base member 51 is formed of austenitic stainless steel containing 20.0% or less by mass of Cr, coking occurring in the inside of threaded hole 46 (the gap between bolt 55 and valve disc 44a, 44b and the gap between bolt 55 and ring base member 51) can be eliminated or significantly reduced. Furthermore, the Cr content of the stainless steel forming valve discs 44a and 44b is 21.0% or less by mass, and Cr of the stainless steel forming ring base member 51 is 20.0% or less by mass. Therefore, even when the Ni content of the stainless steel forming valve discs 44a and 44b is 13.0% or less by mass and the Ni content of the stainless steel forming ring base member 51 is 15.0% or less by mass, the austenite structure of the stainless steel forming valve discs 44a and 44b and ring base member 51 can be stabilized. Gas valve 6 of Example has a longer life than the gas valve of Comparative Example.

Since valve discs 44a and 44b are formed of austenitic stainless steel containing 21.0% or less by mass of Cr and 13.0% or less by mass of Ni and ring base member 51 is formed of austenitic stainless steel containing 20.0% or less by mass of Cr and 15.0% or less by mass of Ni, the cost of valve discs 44a and 44b and ring base member 51 can be reduced. Since valve discs 44a and 44b are formed of austenitic stainless steel containing 21.0% or less by mass of Cr and 13.0% or less by mass of Ni, valve discs 44a and 44b can be produced by casting.

In Example, main body 21 is formed of austenitic stainless steel containing 17.0% or more by mass of Cr and 8.0% or more by mass of Ni. Guide base member 72 is formed of austenitic stainless steel containing 17.0% or more by mass of Cr and 8.0% or more by mass of Ni. Main body 21 and guide base member 72 in Example contains a higher ratio of Cr and a higher ratio of Ni than main body 21 and guide base member 72 in Comparative Example. Therefore, coking occurring in the gap between main body 21 and guide member 70a, 70b (for example, a crack in weld zone 74 between main body 21 and guide base member 72) can be eliminated or significantly reduced. Furthermore, main body 21 and guide base member 72 in Example contain a higher ratio of Ni than main body 21 and guide base member 72 in Comparative Example. Therefore, even when the Cr content in main body 21 and guide base member 72 is increased, the austenite structure of the stainless steel forming main body 21 and guide base member 72 can be stabilized. Gas valve 6 of Example has a longer life than the gas valve of Comparative Example.

When hydrocarbon gas flowing through flow path 22 is propane gas, the amount of coking occurring per unit time in the gap between main body 21 and guide member 70a, 70b (for example, a crack in weld zone 74 between main body 21 and guide base member 72) is small. Therefore, even when main body 21 is formed of austenitic stainless steel containing 21.0% or less by mass of Cr and guide base member 72 is formed of austenitic stainless steel containing 20.0% or less by mass of Cr, coking occurring in the gap between main body 21 and guide member 70a, 70b (for example, a crack in weld zone 74 between main body 21 and guide base member 72) can be eliminated or significantly reduced. Furthermore, the Cr content of the stainless steel forming main body 21 is 21.0% or less by mass and Cr of the stainless steel forming guide base member 72 is 20.0% or less by mass. Therefore, even when the Ni content of the stainless steel forming main body 21 is 13.0% or less by mass and the Ni content of the stainless steel forming guide base member 72 is 15.0% or less by mass, the austenite structure of the stainless steel forming main body 21 and guide base member 72 can be stabilized. Gas valve 6 of Example has a longer life than the gas valve of Comparative Example.

Furthermore, since main body 21 is formed of austenitic stainless steel containing 21.0% or less by mass of Cr and 13.0% or less by mass of Ni and guide base member 72 is formed of austenitic stainless steel containing 20.0% or less by mass of Cr and 15.0% or less by mass of Ni, the cost of main body 21 and guide base member 72 can be reduced. Since main body 21 is formed of austenitic stainless steel containing 21.0% or less by mass of Cr and 13.0% or less by mass of Ni, main body 21 can be produced by casting.

In Example, main body 21 is formed of austenitic stainless steel containing 17.0% or more by mass of Cr and 8.0% or more by mass of Ni. Overlay layer 23 is formed of a material containing more Cr than main body 21 and more Ni than main body 21. Main body 21 and overlay layer 23 in Example contain a higher ratio of Cr and a higher ratio of Ni than main body 21 and overlay layer 23 in Comparative Example. Therefore, coking occurring in the gap between main body 21 and overlay layer 23 (for example, a crack in the weld zone between main body 21 and overlay layer 23) can be eliminated or significantly reduced. Furthermore, main body 21 and overlay layer 23 in Example contain a higher ratio of Ni than main body 21 and overlay layer 23 in Comparative Example. Therefore, even when the Cr content in main body 21 and overlay layer 23 is increased, the austenite structure of the stainless steel forming main body 21 and overlay layer 23 can be stabilized. Gas valve 6 of Example has a longer life than the gas valve of Comparative Example.

When hydrocarbon gas flowing through flow path 22 is propane gas, the amount of coking occurring per unit time in the gap between main body 21 and overlay layer 23 (for example, a crack in the weld zone between main body 21 and overlay layer 23) of the gas valve in Comparative Example is small. Therefore, even when main body 21 is formed of austenitic stainless steel containing 21.0% or less by mass of Cr, coking occurring in the gap between main body 21 and overlay layer 23 can be eliminated or significantly reduced. Furthermore, the Cr content of the stainless steel forming main body 21 is 21.0% or less by mass. Therefore, even when the Ni content of the stainless steel forming main body 21 is 13.0% or less by mass, the austenite structure of the stainless steel forming main body 21 can be stabilized. Gas valve 6 of Example has a longer life than the gas valve of Comparative Example.

Furthermore, since main body 21 is formed of austenitic stainless steel containing 21.0% or less by mass of Cr and 13.0% or less by mass of Ni, the cost of main body 21 can be reduced. Since main body 21 is formed of austenitic stainless steel containing 21.0% or less by mass of Cr and 13.0% or less by mass of Ni, main body 21 can be produced by casting.

The effect of gas valve 6 and the flow rate control method for propane gas according to the present embodiment will be described.

Gas valve 6 according to the present embodiment includes valve body 20 and movable valve 40. Valve body 20 includes main body 21 having flow path 22 through which propane gas having a temperature of 500° C. to 800° C. flows, and main body seat rings 26a and 26b fixed to main body 21. Movable valve 40 can open or close flow path 22. Movable valve 40 includes valve stem 41, valve discs 44a and 44b coupled to valve stem 41, and disc seat rings 50a and 50b. Disc seat rings 50a and 50b each include ring base member 51 and a first overlay layer (overlay layer 53). Ring base member 51 is fixed to valve disc 44a, 44b using bolt 55. The first overlay layer (overlay layer 53) is provided on ring base member 51 and formed of a material having a higher hardness than ring base member 51. When movable valve 40 closes flow path 22, the first overlay layer (overlay layer 53) hermetically comes into contact with main body seat ring 26a, 26b. Valve discs 44a and 44b are formed of a first austenitic stainless steel containing 17.0% by mass to 21.0% by mass of Cr and 8.0% by mass to 13.0% by mass of Ni. Ring base member 51 is formed of a second austenitic stainless steel containing 17.0% by mass to 20.0% by mass of Cr and 8.0% by mass to 15.0% by mass of Ni.

Therefore, coking occurring in the inside of threaded hole 46 receiving bolt 55 (the gap between bolt 55 and valve disc 44a, 44b and the gap between bolt 55 and ring base member 51) can be eliminated or significantly reduced. Gas valve 6 according to the present embodiment has a longer life. Valve discs 44a and 44b can be produced by casting that is inexpensive and facilitates production. Gas valve 6 can be produced inexpensively and with high productivity.

In gas valve 6 according to the present embodiment, the first austenitic stainless steel is cast steel. The second austenitic stainless steel is forging steel. Therefore, gas valve 6 according to the present embodiment has a longer life. Gas valve 6 can be produced inexpensively and with high productivity.

In gas valve 6 according to the present embodiment, ring base member 51 is welded to valve disc 44a, 44b. Ring base member 51 is fixed to valve disc 44a, 44b more securely. During use of gas valve 6, ring base member 51 is less likely to incline to valve disc 44a, 44b and less likely to drop off valve disc 44a, 44b. Gas valve 6 has a longer life.

In gas valve 6 according to the present embodiment, valve body 20 further includes guide members 70a and 70b that guide valve discs 44a and 44b. Guide members 70a and 70b each include guide base member 72 and a second overlay layer (overlay layer 73). Guide base member 72 is welded to main body 21. The second overlay layer (overlay layer 73) is provided on guide base member 72, faces valve disc 44a, 44b, and is formed of a material having a higher hardness than guide base member 72. Main body 21 is formed of a third austenitic stainless steel containing 17.0% by mass to 21.0% by mass of Cr and 8.0% by mass to 13.0% by mass of Ni. Guide base member 72 is formed of a fourth austenitic stainless steel containing 17.0% by mass to 20.0% by mass of Cr and 8.0% by mass to 15.0% by mass of Ni.

Therefore, even when a gap occurs between main body 21 and guide member 70a, 70b (for example, a crack in weld zone 74 between main body 21 and guide base member 72) during use of gas valve 6, coking occurring in this gap can be eliminated or significantly reduced. Gas valve 6 has a longer life. Main body 21 can be produced by casting that is inexpensive and facilitates production. Gas valve 6 can be produced inexpensively and with high productivity.

In gas valve 6 according to the present embodiment, the third austenitic stainless steel is cast steel. The fourth austenitic stainless steel is forging steel. Gas valve 6 therefore has a longer life. Gas valve 6 can be produced inexpensively and with high productivity.

In gas valve 6 according to the present embodiment, guide members 70a and 70b each include a plurality of guide portions 71. A plurality of guide portions 71 each include guide base member 72 and a second overlay layer (overlay layer 73). A plurality of guide portions 71 are spaced apart from each other and arranged in the moving direction of movable valve 40.

Therefore, even when thermal stress is repeatedly applied to main body 21 and guide members 70a and 70b (guide base member 72) during use of gas valve 6, stress strain applied to the weld zone between main body 21 and guide member 70a, 70b (guide base member 72) can be reduced. Guide members 70a and 70b (guide base member 72) are less likely to incline to main body 21 and less likely to drop off main body 21. Guide members 70a and 70b can guide valve discs 44a and 44b for a longer time. Gas valve 6 has a longer life.

In gas valve 6 according to the present embodiment, main body 21 includes a third overlay layer (overlay layer 23) welded to the inner surface of main body 21 defining flow path 22. The third overlay layer (overlay layer 23) is formed of a material containing more Cr than main body 21 and more Ni than main body 21.

Therefore, even when a gap occurs between main body 21 and the third overlay layer (overlay layer 23) (for example, a crack in the weld zone between main body 21 and the third overlay layer (overlay layer 23)) during use of gas valve 6, coking occurring in this gap can be eliminated or significantly reduced. Gas valve 6 has a longer life. Main body 21 can be formed by casting that is inexpensive and facilitates production. Gas valve 6 can be produced inexpensively and with high productivity.

In gas valve 6 according to the present embodiment, the third overlay layer (overlay layer 23) is formed of austenitic stainless steel containing 24.0% by mass to 26.0% by mass of Cr and 19.0% by mass to 22.0% by mass of Ni.

Therefore, even when a gap occurs between main body 21 and the third overlay layer (overlay layer 23) (for example, a crack in the weld zone between main body 21 and the third overlay layer (overlay layer 23)) during use of gas valve 6, coking occurring in this gap can be eliminated or significantly reduced. Gas valve 6 has a longer life.

Gas valve 6 according to the present embodiment includes valve body 20 and movable valve 40. Valve body 20 includes main body 21 having flow path 22 through which propane gas having a temperature of 500° C. to 800° C. flows, and guide members 70a and 70b. Movable valve 40 can open or close flow path 22. Movable valve 40 includes valve stem 41 and valve discs 44a and 44b coupled to valve stem 41. Guide members 70a and 70b guide valve discs 44a and 44b. Guide members 70a and 70b each include guide base member 72 and overlay layer 73. Guide base member 72 is welded to main body 21. Overlay layer 73 is provided on guide base member 72, faces valve disc 44a, 44b, and is formed of a material having a higher hardness than guide base member 72. Main body 21 is formed of a first austenitic stainless steel containing 17.0% by mass to 21.0% by mass of Cr and 8.0% by mass to 13.0% by mass of Ni. Guide base member 72 is formed of a second austenitic stainless steel containing 17.0% by mass to 20.0% by mass of Cr and 8.0% by mass to 15.0% by mass of Ni.

Therefore, even when a gap occurs between main body 21 and guide member 70a, 70b (for example, a crack in weld zone 74 between main body 21 and guide base member 72) during use of gas valve 6, coking occurring in this gap can be eliminated or significantly reduced. Gas valve 6 has a longer life. Main body 21 can be formed by casting that is inexpensive and facilitates production. Gas valve 6 can be produced inexpensively and with high productivity.

Gas valve 6 according to the present embodiment includes valve body 20 and movable valve 40. Valve body 20 includes main body 21 having flow path 22 through which propane gas having a temperature of 500° C. to 800° C. flows, and main body seat rings 26a and 26b fixed to main body 21. Movable valve 40 can open or close flow path 22. Main body 21 includes overlay layer 23 welded to the inner surface of main body 21 defining flow path 22. Movable valve 40 includes valve stem 41, valve discs 44a and 44b coupled to valve stem 41, and disc seat rings 50a and 50b fixed to valve discs 44a and 44b. When movable valve 40 closes flow path 22, disc seat rings 50a and 50b hermetically come into contact with main body seat rings 26a and 26b. Main body 21 is formed of austenitic stainless steel containing 17.0% by mass to 21.0% by mass of Cr and 8.0% by mass to 13.0% by mass of Ni. Overlay layer 23 is formed of a material containing more Cr than main body 21 and more Ni than main body 21.

Therefore, even when a gap occurs between main body 21 and overlay layer 23 (for example, a crack in the weld zone between main body 21 and overlay layer 23) during use of gas valve 6, coking occurring in this gap can be eliminated or significantly reduced. Gas valve 6 has a longer life. Main body 21 can be formed by casting that is inexpensive and facilitates production. Gas valve 6 can be produced inexpensively and with high productivity.

In the flow rate control method for propane gas according to the present embodiment, gas valve 6 according to the present embodiment is used. Therefore, the flow rate of propane gas can be controlled for a longer time.

The flow rate control method for propane gas according to the present embodiment includes feeding propane gas having a temperature of 500° C. to 800° C. to flow path 22 formed in main body 21 of valve body 20 of gas valve 6 (S1) and moving movable valve 40 of gas valve 6 to open or close flow path 22 (S2). Valve body 20 includes main body 21 and main body seat rings 26a and 26b fixed to main body 21. Movable valve 40 includes valve stem 41, valve discs 44a and 44b coupled to valve stem 41, and disc seat rings 50a and 50b. Disc seat rings 50a and 50b each include ring base member 51 and overlay layer 53. Ring base member 51 is fixed to valve disc 44a, 44b using bolt 55. Overlay layer 53 is provided on ring base member 51 and formed of a material having a higher hardness than ring base member 51. When movable valve 40 closes flow path 22, overlay layer 53 hermetically comes into contact with main body seat ring 26a, 26b. Valve discs 44a and 44b are formed of a first austenitic stainless steel containing 17.0% by mass to 21.0% by mass of Cr and 8.0% by mass to 13.0% by mass of Ni. Ring base member 51 is formed of a second austenitic stainless steel containing 17.0% by mass to 20.0% by mass of Cr and 8.0% by mass to 15.0% by mass of Ni.

Therefore, coking occurring in the inside of threaded hole 46 receiving bolt 55 (the gap between bolt 55 and valve disc 44a, 44b and the gap between bolt 55 and ring base member 51) can be eliminated or significantly reduced. With the flow rate control method for propane gas according to the present embodiment, the flow rate of propane gas can be controlled for a longer time.

The flow rate control method for propane gas according to the present embodiment includes feeding propane gas having a temperature of 500° C. to 800° C. to flow path 22 formed in main body 21 of valve body 20 of gas valve 6 (S1) and moving movable valve 40 of gas valve 6 to open or close flow path 22 (S2). Valve body 20 includes main body 21 and guide members 70a and 70b. Movable valve 40 includes valve stem 41 and valve discs 44a and 44b coupled to valve stem 41. Guide members 70a and 70b guide valve discs 44a and 44b. Guide members 70a and 70b each include guide base member 72 and overlay layer 73. Guide base member 72 is welded to main body 21. Overlay layer 73 is provided on guide base member 72, faces valve disc 44a, 44b, and is formed of a material having a higher hardness than guide base member 72. Main body 21 is formed of a first austenitic stainless steel containing 17.0% by mass to 21.0% by mass of Cr and 8.0% by mass to 13.0% by mass of Ni. Guide base member 72 is formed of a second austenitic stainless steel containing 17.0% by mass to 20.0% by mass of Cr and 8.0% by mass to 15.0% by mass of Ni.

Therefore, even when a gap occurs between main body 21 and guide member 70a, 70b (for example, a crack in weld zone 74 between main body 21 and guide base member 72) during use of gas valve 6, coking occurring in this gap can be eliminated or significantly reduced. With the flow rate control method for propane gas according to the present embodiment, the flow rate of propane gas can be controlled for a longer time.

The flow rate control method for propane gas according to the present embodiment includes feeding propane gas having a temperature of 500° C. to 800° C. to flow path 22 formed in main body 21 of valve body 20 of gas valve 6 (S1) and moving movable valve 40 of gas valve 6 to open or close flow path 22 (S2). Valve body 20 includes main body 21 and main body seat rings 26a and 26b fixed to main body 21. Main body 21 includes overlay layer 23 welded to the inner surface of main body 21 defining flow path 22. Movable valve 40 includes valve stem 41, valve discs 44a and 44b coupled to valve stem 41, and disc seat rings 50a and 50b fixed to valve discs 44a and 44b. When movable valve 40 closes flow path 22, disc seat rings 50a and 50b hermetically come into contact with main body seat rings 26a and 26b. Main body 21 is formed of austenitic stainless steel containing 17.0% by mass to 21.0% by mass of Cr and 8.0% by mass to 13.0% by mass of Ni. Overlay layer 23 is formed of a material containing more Cr than main body 21 and more Ni than main body 21.

Therefore, even when a gap occurs between main body 21 and the first overlay layer (overlay layer 23) (for example, a crack in the weld zone between main body 21 and the first overlay layer (overlay layer 23)) during use of gas valve 6, coking occurring in this gap can be eliminated or significantly reduced. With the flow rate control method for propane gas according to the present embodiment, the flow rate of propane gas can be controlled for a longer time.

Embodiments disclosed here should be understood as being illustrative rather than being limitative in all respects. The scope of the present disclosure is shown not in the foregoing description but in the claims, and it is intended that all modifications that come within the meaning and range of equivalence to the claims are embraced here.

REFERENCE SIGNS LIST 1 dehydrogenation system, 2 dehydrogenation reactor, 3, 5, 8, 11, 13, 15 pipeline, 4 valve, 6 gas valve, 20 valve body, 21 main body, 21b tubular member, 22 flow path, 23 overlay layer, 26a, 26b main body seat ring, 27 ring base member, 28, 29 overlay layer, 30, 31, 57, 58, 74 weld zone, 33 valve seat, 35 bonnet, 36 inert gas supplier, 37 pipeline, 38 valve, 39 pressure gauge, 40 movable valve, 41 valve stem, 42 wedge member, 44a, 44b valve disc, 45 overlay layer, 46 threaded hole, 47a, 47b protrusion, 50a, 50b disc seat ring, 51 ring base member, 52, 53 overlay layer, 55 bolt, 60 protrusion base, 61 block, 62 overlay layer, 63 threaded hole, 64 bolt, 70a, 70b guide member, 71 guide portion, 72 guide base member, 73 overlay layer, 75 weld portion.

The invention claimed is:

1. A gas valve comprising:
a valve body including a main body having a flow path through which propane gas having a temperature of 500° C. to 800° C. flows, and a main body seat ring fixed to the main body; and
a movable valve capable of opening or closing the flow path,
the movable valve including a valve stem, a valve disc coupled to the valve stem, and a disc seat ring,
the disc seat ring including a ring base member fixed to the valve disc using a bolt, and a first overlay layer provided on the ring base member and formed of a material having a higher hardness than the ring base member, wherein
when the movable valve closes the flow path, the first overlay layer hermetically comes into contact with the main body seat ring,
the valve disc is formed of a first austenitic stainless steel containing 17.0% by mass to 21.0% by mass of Cr and 8.0% by mass to 13.0% by mass of Ni, and
the ring base member is formed of a second austenitic stainless steel containing 17.0% by mass to 20.0% by mass of Cr and 8.0% by mass to 15.0% by mass of Ni.

2. The gas valve according to claim 1, wherein the ring base member is welded to the valve disc.

3. The gas valve according to claim 1, wherein
the valve body further includes a guide member that guides the valve disc,
the guide member includes a guide base member welded to the main body and a second overlay layer provided on the guide base member, facing the valve disc, and formed of a material having a higher hardness than the guide base member,
the main body is formed of a third austenitic stainless steel containing 17.0% by mass to 21.0% by mass of Cr and 8.0% by mass to 13.0% by mass of Ni, and
the guide base member is formed of a fourth austenitic stainless steel containing 17.0% by mass to 20.0% by mass of Cr and 8.0% by mass to 15.0% by mass of Ni.

4. The gas valve according to claim 3, wherein
the guide member includes a plurality of guide portions,
the guide portions each include the guide base member and the second overlay layer, and
the guide portions are spaced apart from each other and arranged in a moving direction of the movable valve.

5. The gas valve according to claim 1, wherein
the main body further includes a third overlay layer welded to an inner surface of the main body defining the flow path, and
the third overlay layer is formed of a material containing more Cr than the main body and more Ni than the main body.

6. The gas valve according to claim 5, wherein the third overlay layer is formed of austenitic stainless steel containing 24.0% by mass to 26.0% by mass of Cr and 19.0% by mass to 22.0% by mass of Ni.

7. A flow rate control method for propane gas using the gas valve according to claim 1.

* * * * *